US009875428B2

(12) United States Patent
Ramamurthy et al.

(10) Patent No.: US 9,875,428 B2
(45) Date of Patent: Jan. 23, 2018

(54) ENSEMBLE SPARSE MODELS FOR IMAGE ANALYSIS AND RESTORATION

(71) Applicant: ARIZONA BOARD OF REGENTS ON BEHALF OF ARIZONA STATE UNIVERSITY, Tempe, AZ (US)

(72) Inventors: Karthikeyan Ramamurthy, Yorktown Heights, NY (US); Jayaraman Thiagarajan, Dublin, CA (US); Prasanna Sattigeri, Tempe, AZ (US); Andreas Spanias, Tempe, AZ (US)

(73) Assignee: ARIZONA BOARD OF REGENTS ON BEHALF OF ARIZONA STATE UNIVERSITY, Phoenix, AZ (US)

( * ) Notice: Subject to any disclaimer, the term of this patent is extended or adjusted under 35 U.S.C. 154(b) by 72 days.

(21) Appl. No.: 14/772,343

(22) PCT Filed: Mar. 14, 2014

(86) PCT No.: PCT/US2014/028653
§ 371 (c)(1),
(2) Date: Sep. 2, 2015

(87) PCT Pub. No.: WO2014/144306
PCT Pub. Date: Sep. 18, 2014

(65) Prior Publication Data
US 2016/0012314 A1 Jan. 14, 2016

Related U.S. Application Data

(60) Provisional application No. 61/788,124, filed on Mar. 15, 2013.

(51) Int. Cl.
*G06K 9/00* (2006.01)
*G06K 9/62* (2006.01)
*G06K 9/46* (2006.01)

(52) U.S. Cl.
CPC ......... *G06K 9/6244* (2013.01); *G06K 9/6255* (2013.01); *G06K 9/6256* (2013.01); *G06K 2009/4666* (2013.01)

(58) Field of Classification Search
CPC .. G06K 9/6244; G06K 9/6255; G06K 9/6256; G06K 2009/4666
(Continued)

(56) References Cited

U.S. PATENT DOCUMENTS 7,106,914 B2 9/2006 Tipping et al.
2006/0056697 A1 3/2006 Jun et al.
(Continued)

OTHER PUBLICATIONS

K. N. Ramamurthy, J. J. Thiagarajan, and A. Spanias, "Boosted dictionaries for image restoration based on sparse representations," in IEEE ICASSP (accepted), 2013, pp. 1583-1587.
(Continued)

*Primary Examiner* — Daniel Mariam
(74) *Attorney, Agent, or Firm* — Polsinelli PC; Ari M. Bai

(57) ABSTRACT

Methods and systems for recovering corrupted/degraded images using approximations obtained from an ensemble of multiple sparse models are disclosed. Sparse models may represent images parsimoniously using elementary patterns from a "dictionary" matrix. Various embodiments of the present disclosure involve simple and computationally efficient dictionary design approach along with low-complexity reconstruction procedure that may use a parallel-friendly table-lookup process. Multiple dictionaries in an ensemble model may be inferred sequentially using greedy forward-selection approach and can incorporate bagging/boosting strategies, taking into account application-specific degradation. Recovery performance obtained using the proposed approaches with image super resolution and compressive recovery can be comparable to or better than existing sparse (Continued)

modeling based approaches, at reduced computational complexity. By including ensemble models in hierarchical multilevel learning, where multiple dictionaries are inferred in each level, further performance improvements can be obtained in image recovery, without significant increase in computational complexity.

15 Claims, 10 Drawing Sheets

(58) Field of Classification Search
USPC .......................................... 382/160, 226–228
See application file for complete search history.

(56) References Cited

U.S. PATENT DOCUMENTS

2006/0239336 A1    10/2006   Baraniuk et al.
2007/0027656 A1*    2/2007   Baraniuk ............. G06K 9/0057
                                                                   702/189

OTHER PUBLICATIONS

J. J. Thiagarajan, K. N. Ramamurthy, and A. Spanias, "Shift-invariant sparse representation of images using learned dictionaries," IEEE MLSP, pp. 145-150, 2008.
J. Wright, A.Y. Yang, A. Ganesh, S.S. Sastry, and Y. Ma, "Robust face recognition via sparse representation," IEEE Trans. Pattern Analysis and Machine Intelligence, vol. 31, No. 2, pp. 210-227, 2009.
J. Thiagarajan, "Optimality and stability of the K-hyperline clustering algorithm," Patent Recognition Letters, vol. 32, No. 9, pp. 1299-1304. Jul. 2011.
I. Ramirez, P. Sprechmann, and G. Sapiro, "Classification and clustering via dictionary learning with structured incoherence and shared features," in IEEE CVPR, 2010, pp. 3501-3508.
J. Mairal, G. Sapiro, and M. Elad, "Multiscale sparse image representation with learned dictionaries," in IEEE ICIP, 2007, pp. III-105-III-108.
J. Mairal, F. Bach, J. Ponce, G. Sapiro, and A. Zisserman, "Supervised dictionary learning," Advances in neural information processing systems, 2008.
J. Mairal, F. Bach, J. Ponce, and G. Sapiro, "Online dictionary learning for sparse coding," in Proc. ICML, 2009, pp. 689-696.
J. Mairal, F. Bach, J. Ponce, G. Sapiro, and A. Zisserman, "Non-local sparse models for image restoration," in IEEE ICCV, 2009, pp. 2272-2279.
J. Mairal, F. Bach, J. Ponce, and G. Sapiro, "Online learning for matrix factorization and sparse coding," JMLR, vol. 11, No. 1, pp. 19-60, 2009.
R. Jenatton, J. Mairal, G. Obozinski, and F. Bach, "Proximal methods for sparse hierarchical dictionary learning," in ICML, J. Frankranz and T. Joachims, Eds. Omnipress, 2010, pp. 487-494.
J. Mairal et al. "Discriminative Learned Dictionaries for Local Image Analysis". IEEE, CVPR, Jun. 2008, pp. 1-8.
J. Mairal et al., "Learning multi-scale sparse representations for image and video restoration". SIAM Multiscale Modeling and Simulation, vol. 7, Issue 1, 2008, pp. 214-241.
B. Efron, T. Hastie, I. Johnstone, and R. Tibshirani, "Least angle regression," The Annals of statistics, vol. 32, No. 2, pp. 407-499, 2004.
C.H. Lee et. al., "Segmenting brain tumors with conditional random fields and support vector machines" Computer Vision for Biomedical Image Applications., vol. 3765 (2005) 469-478.
H. Lee, A. Battle, R. Raina, and A.Y. Ng, "Efficient sparse coding algorithms," Advances in neural information processing systems, vol. 19, pp. 801, 2007.
R. Raina et.al., "Self-taught learning: Transfer learning from unlabeled data," in ICML, 2007., pp. 759-766.

Mallat and Z. Zhang, "Matching pursuits with time-frequency dictionaries," IEEE TSP, vol. 41, No. 12, pp. 3397-3415, 1993.
G. Yu, G. Sapiro, and S. Mallat, "Image modeling and enhancement via structured sparse model selection," in IEEE ICIP, 2010, pp. 1641-1644.
Y. Freund, R. Schapire, and N. Abe, "A short introduction to boosting," Journal-Japanese Society for Artificial Intelligence, vol. 14, No. 5, pp. 771-780, 1999.
W. Zhang, A. Surve, X. Fern, and T. Dietterich, "Learning non-redundant codebooks for classifying complex objects," in Proc. '09 ICML, 2009, pp. 1241-1248.
T. Dietterich, "Ensemble methods in machine learning," Multiple classifier systems, pp. 1-15, 2000.
T. G. Dietterich, "An experimental comparison of three methods for constructing ensembles of decision trees: Bagging, boosting, and randomization," Machine learning, vol. 40, No. 2, pp. 139-157, 2000.
D. Arthur and S. Vassilvitskii, "K-means++: The advantages of careful seeding," in Proc. ACM-SIAM symposium on Discrete algorithms, 2007, pp. 1027-1035.
B. Bahmani, B. Moseley, A. Vattani, R. Kumar, and S. Vassilvitskii, "Scalable k-means++," Proc. VLDB Endowment, vol. 5, No. 7, pp. 622-633, 2012.
S. Cotter, R. Adler, R. Rao, and K. Kreutz-Delgado, "Forward sequential algorithms for best basis selection," in IEEE Proc.-Vision, Image and Signal Processing, vol. 146, No. 5. IET, 1999, pp. 235-244.
I. F. Gorodnitsky and B. D. Rao, "Sparse signal reconstruction from limited data using FOCUSS: A re-weighted norm minimization algorithm," IEEE TSP, vol. 45, No. 3, pp. 600-616, Mar. 1997.
K. Huang and S. Aviyente, "Sparse representation for signal classification," in Advances in NIPS. MIT Press, pp. 609-616, 2006.
Q. Zhang and B. Li, "Discriminative K-SVD for dictionary learning in face recognition," in IEEE 2010 CVPR, pp. 2691-2698, 2010.
R. Polikar, "Ensemble based systems in decision making," IEEE Circuits and Systems Mag., vol. 6, No. 3, pp. 21-45, 2006.
N. Duffy and D. Helmbold, "Boosting methods for regression," Machine Learning, vol. 47, No. 2, pp. 153-200, 2002.
E. Elhamifar and R. Vidal, "Sparse subspace clustering: Algorithm, theory, and applications," IEEE Transactions on Pattern Analysis and Machine Intelligence, vol. 35, No. 11, pp. 2765-2781, 2013.
R. Vidal, Y. Ma, and S. Sastry, "Generalized principal component analysis (GPCA)," IEEE TPAMI, vol. 27, No. 12, pp. 1945-1959, 2005.
A. Y. Ng, M. I. Jordan, Y. Weiss et al., "On spectral clustering: Analysis and an algorithm," Advances in NIPS, 2001.
Z. Jiang et.al., "Learning a discriminative dictionary for sparse coding via label consistent K-SVD," in IEEE CVPR, pp. 1697-1704, 2011.
R. Gribonval and M. Nielsen, "Sparse representations in unions of bases," IEEE Trans. Inf. Theory, vol. 49, No. 12, pp. 3320-3325, 2003.
R. Gribonval and K. Schnass, "Dictionary Identification—Sparse Matrix—Factorisation via '1-Minimisation," IEEE Trans. on Inf. Theory, vol. 56, No. 7, pp. 3523-3539, Jul. 2010.
M. S. Lewicki and T. J. Sejnowski, "Learning over complete representations," Neural Comp., vol. 12, No. 2, pp. 337-365, 2000.
L. Bar and G. Sapiro, "Hierarchical dictionary learning for invariant classification," in IEEE ICASSP, Mar. 2010, pp. 3578-3581.
K. Engan, S. O. Aase, and J. H. Husoy, "Method of optimal directions for frame design," in IEEE ICASSP, vol. 5, pp. 2443-2446, 1999.
K. Engan, B. Rao, and K. Kreutz-Delgado, "Frame design using FOCUSS with method of optimal directions (MoD)," in Norwegian Signal Processing Symposium, 1999.
J. Duarte-Carvajalino and G. Sapiro, "Learning to sense sparse signals: simultaneous sensing matrix and sparsifying dictionary optimization," IEEE TIP, vol. 18, No. 7, pp. 1395-1408, 2009.
A. Caponnetto and A. Rakhlin, "Stability properties of empirical risk minimization over Donsker classes," JMLR, vol. 7, pp. 2565-2583, 2006.

(56) References Cited

OTHER PUBLICATIONS

A. Rakhlin and A. Caponnetto, "Stability of K-means clustering," in Advances in Neural Information Processing Systems, vol. 19. Cambridge, MA: MIT Press, 2007.

T. Poggio, R. Rifkin, S. Mukherjee, and P. Niyogi, "General conditions for predictivity in learning theory," Nature, vol. 428, No. 6981, pp. 419-422, 2004.

S. Ben-David, U. von Luxburg, and D. P'al, "A sober look at clustering stability," 19th Annual Conference on Computational Learning Theory, pp. 5-19, 2006.

S. Ben-David, D. P'al, and H. U. Simon, "Stability of K-means clustering," ser. Lecture Notes in Computer Science, vol. 4539. Springer, 2007, pp. 20-34.

A. Maurer and M. Pontil, "K-Dimensional Coding Schemes in Hilbert Spaces," IEEE Trans. on Inf. Theory, vol. 56, No. 11, pp. 5839-5846, 2010.

D. Vainsencher and A. M. Bruckstein, "The Sample Complexity of Dictionary Learning," JMLR, vol. 12, No. 11, pp. 3259-3281, 2011.

P. Bradley and O. Mangasarian, "K-plane clustering," Journal of Global Opt., vol. 16, No. 1, pp. 23-32, 2000.

P. Agarwal and N. Mustafa, "K-means projective clustering," in ACM SIGMOD-SIGACT-SIGART symposium on Principles of database systems. ACM, 2004, pp. 155-165.

P. Tseng, "Nearest q-flat to m points," Journal of Optimization Theory and Applications, vol. 105, No. 1, pp. 249-252, 2000.

J. M. Buhmann, "Empirical risk approximation: An induction principle for unsupervised learning," The University of Bonn, Tech. Rep. IAI-TR-98-3, 1998.

S. Zhu, K. Shi, and Z. Si, "Learning explicit and implicit visual manifolds by information projection," Patt. Rec. Letters, vol. 31, No. 8 pp. 667-685, 2010.

L. Breiman, "Pasting small votes for classification in large databases and on-line," Machine Learning, vol. 36, No. 1, pp. 85-103, 1999.

Dabov et al. "Image Denoising by Sparse 3-D Transform-Domain collaborative Filtering". IEEE Transactions on Image Processing, vol. 16, No. 8, pp. 2080-2095, Aug. 2007.

S. Baker and T. Kanade. "Limits on super-resolution and how to break them". IEEE TPAMI, vol. 24, No. 9, pp. 1167-1183, 2002.

H. Chang, D.-Y. Yeung, and Y. Xiong. "Super-resolution through neighbor embedding". CVPR, vol. 1, 2004.

S. Dai, et al. "Soft edge smoothness prior for alpha channel super resolution", IEEE Proc. ICCV, pp. 1063-6919, 2007.

S. Farsiu, et al., "Fast and Robust Multiframe Super-resolution". IEEE TIP, vol. 13, No. 10, pp. 1327-1344, 2004.

W.T. Freeman et al., "Learning low-level vision". IJCV, vol. 40, No. 1, pp. 25-47, 2000.

W.T. Freeman et al., "Example-based super-resolution". IEEE Computer Graphics and Applications, vol. 22, No. 2, pp. 56-65, 2002.

R. C. Hardie et al., Joint MAP registration and high-resolution image estimation using a sequence of under sampled images. IEEE TIP, vol. 6, No. 12, pp. 1621-1633, 1997.

M. Irani and S. Peleg. "Motion analysis for image enhancement: resolution, occlusion, and transparency". JVCI, vol. 4, No. 4, pp. 324-335, 1993.

C. Liu et al., "Face Hallucination: theory and practice". IJCV, vol. 75, No. 1, pp. 115-134, Oct. 2007.

E. Nowak et al., "Sampling strategies for bag-of-features image classification". Proc. ECCV, vol. 3954, pp. 490-503, 2006.

L. C. Pickup et al., "A sampled texture prior for image super-resolution". Proc. NIPS, 2003.

H. Rauhut et al., "Compressed sensing and redundant dictionaries". IEEE Transactions on Information Theory, vol. 54, No. 5, pp. 2210-2219. May 2008.

S. T. Roweis and L. K. Saul. "Nonlinear dimensionality reduction by locally linear embedding". Science, vol. 290, No. 5500, pp. 2323-2326, 2000.

J. Sun et al., "Image hallucination with primal sketch priors". Proc. CVPR, vol. 2, pp. 729-736, 2003.

R. Tibshrani. "Regression shrinkage and selection via the Lasso". J. Royal Statist. Soc B., vol. 58, No. 1, pp. 267-288, 1996.

Q. Wang et al., "Patch based blind image super resolution". Proc. ICCV '05, vol. 1, pp. 709-771, 2005.

D. Capel. Image Mosaicing and super-resolution. Ph.D. Thesis, Department of Eng. Science, University of Oxford, 2001.

International Search Report for PCT/US2014/028653, dated Aug. 15, 2014.

F. Abrard et. al, "A time-frequency blind signal separation method applicable to underdetermined mixtures of dependent sources" Signal Processing., 85, pp. 1389-1403, 2005.

V. G. Reju et. al, "An algorithm for mixing matrix estimation in instantaneous blind source separation" Signal Processing., 89, pp. 1762-1773, 2009.

O. Yilmez et. al, "Blind Separation of Speech Mixtures via Time-Frequency Masking" IEEE Transactions on Signal Processing., vol. 52, pp. 1830-1847, 2004.

Z. He et. al, "K-hyperline Clustering Learning for Sparse Component Analysis" Signal Processing., 89, pp. 1011-1022, 2009.

Y. Li et. al, "Underdetermined Blind Source Separation Based on Sparse Representation" IEEE Transactions on Signal Processing., vol. 54, No. 2, pp. 423-447, 2006.

J. Wang, Y. Li, Y. Zhang, H. Xie, and C. Wang, "Boosted learning of visual word weighting factors for bag-of-features based medical image retrieval," in International Conference on Image and Graphics, pp. 1035-1040. 2011.

T.F. Chan and L.A. Vese "Active contours without edges" IEEE Transactions on Image Processing. 10 (2) (2001) 266-277.

J.J. Corso et. al., "Efficient multilevel brain tumor segmentation with integrated bayesian model classification" IEEE Transactions on Medical Imaging., 27 (5) (2008) 629-640.

M. E. Tipping and C. M. Bishop. "Bayesian Image super-resolution". Proc. NIPS, 2003.

M.N. Ahmed et. al., "A modified fuzzy c-means algorithm for bias field estimation and segmentation of MRI data" IEEE Transactions on Medical Imaging., 21 (3) (2002) 193-199.

A. Hamamci et. al., "Tumor-cut: Segmentation of Brain Tumors on Contrast Enhanced MR Images for Radiosurgery Applications" IEEE Transactions on Medical Imaging., 31 (3) (2012) 790-804.

Yang J., Wright, J., Huang, T. S., & Ma, Y., "Image super-resolution via sparse representation," Image Processing, IEEE Transactions on, 19(11), 2861-2873, 2010.

Yang, J., Wright, J., Huang, T. S., & Ma, Y., "Image super-resolution as sparse representation of raw image patches." In Computer Vision and Pattern Recognition, 2008. CVPR 2008. IEEE Conference on, pp. 1-8. IEEE, 2008.

J. Yang et.al., "Linear spatial pyramid matching using sparse coding for image classification," in IEEE CVPR, 2009.

B. Cheng J. Yang, S. Yan, Y. Fu, and T. S. Huang, "Learning with '1-graph for image analysis." IEEE transactions on image processing : a publication of the IEEE Signal Processing Society, vol. 19, No. 4, pp. 858-866, Apr. 2010.

L. Gan, "Block compressed sensing of natural images." In Digital Signal Processing, 2007 15th International Conference on, pp. 403-406. IEEE, 2007.

E. Candes, J. Romberg, and T. Tao, "Robust uncertainty principles: Exact signal reconstruction from highly incomplete frequency information," IEEE Trans. Inform. Theory, vol. 52, pp. 489-509, Feb. 2006.

E. Candes and J. Romberg, "signal recovery from random projections,". Proc. SPIE 5674, Computational Imaging III, Mar. 2005.

E. Candes and J. Romberg "sparsity and incoherence in compressive Sensing" Inverse Problems, vol. 23, pp. 969-985, 2007.

D. L. Donoho, "Compressed sensing," IEEE Trans. Inform. Theory, vol. 52, No. 4, pp. 1289-1306, Jul. 2006.

E. J. Candes and L. Demanet, "The curvelet representation of wave propagators is optimally sparse," Comm. Pure Appl. Math, vol. 58, pp. 1472-1528, 2004.

Y. Tsaig and D. L. Donoho, "Extensions of compressed sensing," Signal Processing, vol. 86, pp. 533-548, Jul. 2006.

D. L. Donoho, Y. Tsaig, I. Drori, and J.-L. Starck, "Sparse solution of underdetermined linear equations by stagewise orthogonal matching pursuit," IEEE Transactions on Information Theory, vol. 58, No. 2, pp. 1094-1121. 2012.

(56) References Cited

OTHER PUBLICATIONS

J. Starck, F. Murtagh, and J. Fadili, "Sparse image and signal processing: wavelets, curvelets, and morphological diversity". Cambridge Univ Pr, 2010.
D. Donoho and I. Johnstone, "Ideal spatial adaptation via wavelet shrinkage," Biometrika, vol. 81, p. 425-455, 1994.
D. L. Donoho and M. Elad, "Optimally sparse representation in general (nonorthogonal) dictionaries via l minimization." PNAS of USA, vol. 100, No. 5, pp. 2197-2202, Mar. 2003.
S. S. Chen, D. L. Donoho, and M. A. Saunders, "Atomic decomposition by basis pursuit," SIAM Review, vol. 43, No. 1, pp. 129-159, 2001.
D. L. Donoho. "For most large underdetermined systems of linear equations, the minimal l1-norm solution is also the sparsest solution". Comm. On Pure and Applied Math, vol. 59, No. 6, 2006.
J. A. Tropp, M. B. Wakin, M. F. Duarte, D. Baron, and R. G. Baraniuk, "Random filters for compressive sampling and reconstruction," in Proc. Int. Conf. Acoustics, Speech, Signal Processing (ICASSP), France, May 2006.
J. A. Tropp, "Greed is good: Algorithmic results for sparse approximation," IEEE Trans. Inform. Theory, vol. 50, pp. 2231-2242, Oct. 2004.
D. Takhar, et.al, "A new compressive imaging camera architecture using optical-domain compression," in SPIE Proc. Computational Imaging IV, Jan. 2006.
C. La and M. N. Do, "Signal reconstruction using sparse tree representations," in SPIE Proc. Computational Imaging IV, Jan. 2005.
I. Daubechies, M. Defrise, and C. D. Mol, "An iterative thresholding algorithm for linear inverse problems with a sparsity constraint," Comm. Pure Appl. Math, vol. 57, pp. 1413-1541, 2004.
I. Daubechies, "Ten lectures on wavelets," SIAM, Philadelphia, CMBS conference Series, 1992.
T. D. Tran, J. Liang, and C. Tu, "Lapped transform via time domain pre- and post-filtering," IEEE Trans. Signal Processing, vol. 51, pp. 1557-1571, Jun. 2003.
C. Tu and T. D. Tran, "Context based entropy encoding of block coefficient transforms for image compression," IEEE Trans. Image Processing, vol. 11, pp. 1271-1283, Nov. 2002.
D. J. Field, "What is the goal of sensory coding?" Neural computation, vol. 6, No. 4, pp. 559-601, 1994.
B. A. Olshausen and D. J. Field, "Sparse coding with an over complete basis set: A strategy employed by V1?" Vision Research, vol. 37, No. 23, pp. 3311-3325, Dec. 1997.
D. J. Field, "Relations between the statistics of natural images and the response properties of cortical cells," Journal of the Optical Society of America, vol. 4, pp. 2379-2394, 1987.
M. Aharon, M. Elad, and A. Bruckstein, "The K-SVD: an algorithm for designing of over complete dictionaries for sparse representation," IEEE Trans. Signal Processing, vol. 54, No. 11, pp. 4311-4322, 2006.
M. Elad, "Why simple shrinkage is still relevant for redundant representations?" IEEE Trans. Inf. Theory, vol. 52, No. 12, pp. 5559-5569, Dec. 2006.
M. Elad et.al, "A wide-angle view at iterated shrinkage algorithms," in SPIE (Wavelet XII) 2007.
M. Aharon and M. Elad, "Image denoising via sparse and redundant representations over learned dictionaries," IEEE TIP, vol. 15, No. 12, pp. 3736-3745, 2006.
M. Elad and I. Yavneh, "A plurality of sparse representations is better than the sparsest one alone," IEEE Trans. Inf. Theory, vol. 55, No. 10, pp. 4701-4714, 2009.
R. Rubinstein, A. Bruckstein, and M. Elad, "Dictionaries for sparse representation modeling," Proc. IEEE, vol. 98, No. 6, pp. 1045-1057, 2010.
J.J. Thiagarajan, K.N. Ramamurthy, and A. Spanias, "Multilevel dictionary learning for sparse representation of images," in IEEE DSPE Workshop, 2011, pp. 271-276.
J. J. Thiagarajan, K. N. Ramamurthy, and A. Spanias, "Sparse representations for pattern classification using learned dictionaries," Proc. SGAI Int. Conf. on AI, 2008.
J. J. Thiagarajan, K. N. Ramamurthy, P. Knee, and A. Spanias, "Sparse representations for automatic target classification in SAR images," in ISCCSP, 2010.
J. J. Thiagarajan and A. Spanias, "Learning dictionaries for local sparse coding in image classification," in Proc. Asilomar SSC, 2011.
J. J. Thiagarajan, K. N. Ramamurthy, P. Sattigeri, and A. Spanias, "Supervised local sparse coding of sub-image features for image retrieval," in IEEE ICIP, 2012.

\* cited by examiner

TABLE I

| Image | Number of Measurements (N) | | | | | | | | | | | | | | |
|---|---|---|---|---|---|---|---|---|---|---|---|---|---|---|---|
| | N = 8 | | | | | N = 16 | | | | | N = 32 | | | | |
| | Alt-Opt | BEx | BKM | RExAv | Ex-MLD | Alt-Opt | BEx | BKM | RExAv | Ex-MLD | Alt-Opt | BEx | BKM | RExAv | Ex-MLD |
| Barbara | 21.55 | 22.05 | 22.04 | 22.08 | 22.95 | 23.52 | 23.86 | 23.73 | 23.68 | 24.39 | 26.45 | 26.53 | 26.44 | 26.28 | 26.66 |
| Boat | 23.08 | 23.73 | 23.95 | 23.99 | 25.08 | 25.91 | 26.29 | 26.57 | 26.59 | 26.96 | 28.79 | 29.32 | 29.61 | 29.61 | 29.9 |
| Couple | 23.15 | 23.81 | 24.02 | 24.05 | 25 | 25.87 | 26.30 | 26.57 | 26.56 | 27.19 | 28.83 | 29.33 | 29.68 | 29.67 | 29.8 |
| Fingerprint | 18.10 | 18.76 | 19.15 | 19.16 | 20.39 | 21.74 | 22.18 | 22.84 | 22.86 | 23.19 | 25.36 | 25.85 | 26.59 | 26.63 | 26.82 |
| House | 24.52 | 25.12 | 25.51 | 25.52 | 26.55 | 28.01 | 28.14 | 28.63 | 28.66 | 28.93 | 31.28 | 31.53 | 32.01 | 32.03 | 32.25 |
| Lena | 25.14 | 25.84 | 26.18 | 26.25 | 27.17 | 28.31 | 28.73 | 29.08 | 29.13 | 29.59 | 31.12 | 31.77 | 32.15 | 32.17 | 32.65 |
| Man | 23.90 | 24.60 | 24.83 | 24.89 | 25.84 | 26.60 | 27.12 | 27.35 | 27.40 | 27.68 | 29.45 | 30.14 | 30.40 | 30.42 | 30.67 |
| Peppers | 21.31 | 21.83 | 22.17 | 22.23 | 23.12 | 24.30 | 24.54 | 24.82 | 24.91 | 25.68 | 27.28 | 27.69 | 28.03 | 28.11 | 28.57 |

TABLE II

| Image | Bicubic | PairDict | ExDict | BEx | BKM | RExAv |
|---|---|---|---|---|---|---|
| Lena | 34.10 | 35.99 | 35.99 | 35.97 | 35.95 | 35.99 |
| Boat | 29.94 | 31.34 | 31.34 | 31.28 | 31.23 | 31.29 |
| House | 32.77 | 34.49 | 34.49 | 34.38 | 34.41 | 34.41 |
| Cameraman | 26.33 | 27.78 | 27.78 | 27.72 | 27.78 | 27.71 |
| Straw | 24.20 | 25.93 | 25.93 | 25.90 | 25.90 | 25.94 |
| Girl | 33.81 | 35.39 | 35.39 | 35.33 | 35.37 | 35.35 |

Figure 10

ENSEMBLE SPARSE MODELS FOR IMAGE ANALYSIS AND RESTORATION

CROSS REFERENCE TO RELATED APPLICATION

The present non-provisional utility application claims priority under 35 U.S.C. § 119(e) to provisional application No. 61/788,124 entitled "Ensemble Sparse Models For Image Analysis And Restoration," filed on Mar. 15, 2013 and which is hereby incorporated by reference in its entirety.

FIELD

Aspects of the present disclosure relate to systems and method for the analysis and restoration of degraded images.

BACKGROUND

The elementary set of patterns available in natural images is finite, and can typically consist of edges, wedges, curves, smooth regions and textures. These elementary patterns can be stacked together as columns of a "dictionary" matrix. Any local region commonly referred to as a "patch" in a natural image can be represented as a linear combination of a small number of columns from the dictionary. This operation is referred to as sparse coding, and computing sparse codes for images is a nonlinear and complex procedure. The dictionaries for sparse coding may be pre-defined but they can also be adapted to a set of training examples. Dictionary learning is an iterative procedure that is often times is computationally expensive and usually requires a large training set is necessary to obtain good dictionaries.

Sparse approximation using learned dictionaries have been shown to provide improved performance for restoring degraded data in applications such as image denoising, inpainting, deblurring, single image super resolution, and compressive sensing.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only typical embodiments of the present disclosure and, therefore, are not to be considered limiting in scope.

FIG. 10 shows one table for compressed recovery of standard images and another table for superresolution of standard images.

DETAILED DESCRIPTION

Figure 1:
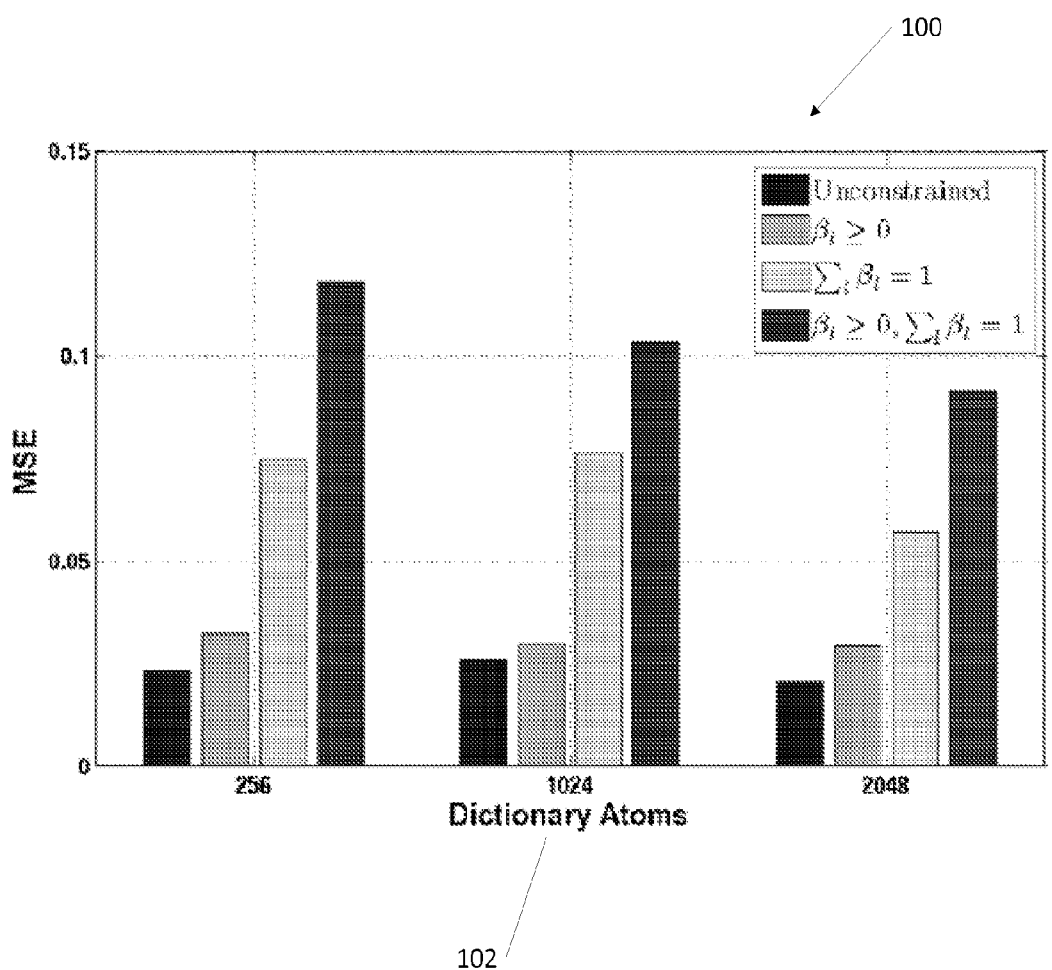
FIGS. 1-2 are illustrations of ensemble model performance tables, according to aspects of the present disclosure.

Aspects of the present disclosure involve methods and systems for automatically learning an ensemble of sparse models that may be executed to perform image recovery. In various aspects, approximations of an image may be obtained from the multiple sparse models included within the ensemble. The approximations may be based, in part, on learned dictionaries. Two different methodologies for constructing the dictionaries may be implemented. First, a dictionary may be generated using different random subsets from the data as the dictionary (referred to herein as "bagging"). Alternatively and/or in addition, a dictionary may be generated sequentially such that the current dictionary prioritizes the poorly represented samples in the previous iteration (referred to herein as "boosting"). In some embodiments, boosted approaches can learn one dictionary per round such that the dictionary learned in a particular round is optimized for the training examples having high reconstruction error in the previous round. The approximations obtained from the individual sparse models may be suitably aggregated in order to obtain a final reconstruction of the recovered image.

As will be described in further detail below, an ensemble model approximates the data of an image as a linear combination of approximations obtained from multiple weak sparse models. Images reveal statistics that allow them to be efficiently represented using a sparse linear combination of elementary patterns. The local regions of natural images, referred to as patches, can be represented using a sparse linear combination of columns from a dictionary matrix. Given a data sample $X \in \mathcal{R}^M$, and a dictionary matrix $D \in \mathcal{R}^{M \times K}$, the data approximated using the linear generative model as $Da$, where $a \in \mathcal{R}^M$ is the sparse coefficient vector. This generative model that incorporates sparsity constraints in the coefficient vector, will be referred to as the "sparse model". The dictionary can be either pre-defined or learned from the training examples themselves. Learned dictionaries have been shown to provide improved performance for restoring degraded data in applications such as denoising, inpainting, deblurring, superresolution, and compressive sensing and also in machine learning applications such as classification and clustering.

Using the proposed ensemble models may provide comparable or better performance at a much reduced computational cost. Moreover, by including ensemble models in hierarchical multilevel learning, where multiple dictionaries are inferred in each level, further performance improvements are obtained, without significant increase in computational complexity.

Sparse Coding and Dictionary Learning

Using the linear generative model, the sparse code of a data sample x can be obtained by optimizing, $$h(x, D) = \min_a \|x - Da\|_2^2 + \lambda \|a\|_1 \qquad (1)$$

Here $\|a\|$ is the $l_1$ penalty that promotes sparsity of the coefficients, and the equivalence of (1) to $l_0$ minimization has been analyzed under some strong conditions on the dictionary. Some methods to obtain sparse representations used include the Matching Pursuit (MP), Orthogonal Matching Pursuit (OMP), Order-Recursive Matching Pursuit, Basis Pursuit (BP), FOCUSS and iterated shrinkage algorithms.

In several image processing and sample machine learning applications, it may be appropriate to learn a dictionary, such that the set of training examples obtained from a probability space have a small approximation error with sparse coding. This problem can be expressed as minimizing the objective $$g(D) = E_X[h(x,D)] \qquad (2)$$

Where the columns of D, referred to as dictionary atoms, are constrained to have unit $l_2$ norm, i.e., $\|d_j\|_2 \leq 1$, $\forall j$. If the distribution in the probability space is unknown and we only have T training examples $\{x_i\}_{i=1}^T$, each with probability mass $p(x_i)$, (2) can be modified as the empirical cost function $$g(D) = \sum_{i=1}^{T} h(x_1, D)p(x_i) \qquad (3)$$

Typically dictionary learning algorithms solve for the sparse codes using (1), and obtain the dictionary by minimizing $\hat{g}(D)$, repeating the steps until convergence. We refer to this baseline algorithm as "Alt-Opt". Since this is an alternating minimization process, it may be prudent to provide a good initial dictionary and this is performed by setting the atoms to normalized cluster centers of the data. Since the number of examples T is usually much larger than the number of dictionary atoms K, it is much more computationally intensive to obtain sparse representations with examples. Nevertheless, both learned and example-based dictionaries have found applications in inverse problems and also in machine learning applications such as clustering and classification.

Ensemble Sparse Models

According to one embodiment, data, such as images, image data, and/or the like, may be represented using a linear combination of L different sparse approximations, instead of being represented using an approximation obtained from a single sparse model. The approximation to x can be obtained by optimizing $$\min_{\{\beta_l\}_{l=1}^L} \left\| x - \sum_{l=1}^{L} \beta_l D_l a_l \right\|_2^2 \qquad (4)$$

Here each coefficient vector $a_l$ is assumed to be sparse, and is obtained by solving for the optimization (1) with $D_l$ as the dictionary. The weights $\{\beta_l\}_{l=1}^L$ control the contribution of each base model to the ensemble.

Since the ensemble combines the contributions of multiple models, it is sufficient that the dictionary for model is obtained using a "weak" training procedure. Accordingly, "weak dictionaries," $\{D_l\}_{l=1}^L$, may be learned sequentially, using a greedy forward selection procedure, such that training examples that incurred a high approximation error with the dictionary $D_l$ are given more importance while learning $D_{l+1}$. Furthermore, in various embodiments, an ensemble model where each individual dictionary is designed as a random subset of training samples, may be learned. In supervised learning, boosting is used to improve the accuracy of learning algorithms, using multiple weak hypotheses instead of a single strong hypothesis. The proposed ensemble sparse models are geared towards image restoration.

Two approaches may be used for learning the ensemble: (a) using a random selection and averaging (RandExAv) approach, where each dictionary is chosen as a random subset of the training examples, and (b) using a boosted approach to learn dictionaries sequentially by modifying the probability masses of the training examples in each round of learning. In the boosted approach, a method to learn the weak dictionaries by example selection using the probability distribution on the training set (BoostEx) is provided. For all cases of ensemble learning, we also provide methods to obtain the ensemble weights $\{\beta_l\}_{l=1}^L$, from the training examples.

According to one embodiment, the learned ensemble models may be applied during image restoration. The image restoration problems that we consider here are compressive sensing using random projections and single image super-resolution. When boosted ensemble models are learned for image restoration problems, the form of degradation operator specific to the application is also considered, thereby optimizing the ensemble for the application. For compressive recovery, we compare the performance of the proposed ensemble models to the single sparse model, whose dictionary is obtained using the Alt-Opt approach. Note that, the base sparse model for the example-based approaches is designed as a random subset of examples, and hence it requires minimal training.

Need for the Ensemble Model

In several scenarios, a single sparse model may be insufficient for representing the data, and using an ensemble model instead may result in a good performance. For example, statistical issues may arise, whereby several sparse models may have a similar training error when learned from a limited number of training samples. However, the performance of each of these models individually with test data can be poor. By averaging representations obtained from an ensemble, we may obtain an approximation closer to the true test data. The second reason is computational, which can occur with the case of large training sets also. The inherent issue in this case is that sparse modeling is a problem with locally optimal solution. Therefore, we may never be able to reach the global optimal solution with a single model and hence using an ensemble model may result in a lesser representation error. Note that this case is quite common in dictionary learning, since many dictionary learning algorithms only seek a local optimal solution. The third reason for using an ensemble model is representational, wherein the hypothesis space assumed cannot represent the test data sample. In the case of sparse models, this corresponds to the case where the dictionary may not provide a high-fidelity sparse approximation for a novel test data sample. This also happens in the case where the test observation is a corrupted version of the underlying test data, and there is ambiguity in obtaining a sparse representation. In this case also, it may be necessary to combine multiple sparse models to improve the estimate of the test data.

In order to simplify notation in the following analysis, let us denote the $i^{th}$ approximation in the ensemble model as $c_i = D_i a_i$. $C \in R^{M \times L}$, where $C = [c_1 \ldots c_L]$ and the weight vector is denoted as $\beta = [\beta_1 \ldots \beta_L]^T$. The individual residuals are denoted as $r_i = x - c_i$, for $i = 1, \ldots, L$, and the total residual of the approximation is given as $$r = x - C\beta \qquad (5)$$

We characterize the behavior of the ensemble sparse model by considering four different cases for the weights $\{\beta_l\}_{l=1}^{L}$.

Unconstrained Weights:

In this case, the ensemble weights $\{\beta_l\}_{l=1}^{L}$ are assumed to be unconstrained and computed using the unconstrained least squares approximation $$\min_{\beta}\|x - C\beta\|_2^2 \quad (6)$$

When the data x lies in the span of C, the residual will be zero, i.e., r=0. The residual that has minimum energy in the L approximations is denoted as $r_{min}$. This residual can be obtained by setting the corresponding weight in the vector β to be 1, whereas (6) computes β that achieves the best possible residual r for the total approximation. Clearly this implies $$\|r\|_2 \leq \|r_{min}\|_2 \quad (7)$$

Therefore, at worst, the total approximation will be as good as the best individual approximation. $\beta_l \geq 0$: The ensemble weights $\{\beta_l\}_{l=1}^{L}$ are assumed to be non-negative in this case. The least squares approximation (4), with the constraint $\beta \geq 0$ will now result in a zero residual if the data x lies in the simplical cone generated by the columns of C. The simplical cone is defined as the set $$\left\{b: b = \sum_{l=1}^{L} c_l \beta_l\right\}.$$

Otherwise, the bound on the total residual given by (7) holds in this case, since $r_{min}$ can be obtained by setting the appropriate weight in β to 1 in (5), and the rest to 0 in this case also $$\sum_{l=1}^{L} \beta_l = 1:$$

When the ensemble weights are constrained to sum to 1, the total residual can be expressed as $$r = \sum_{l=1}^{L} \beta_l r_l \quad (8)$$

This can be easily obtained by replacing x as $$\sum_{l=1}^{L} \beta_l x$$

in (5). Denoting the residual matrix $R=[r_1 \ldots r_L]$, the optimization (4) to compute the weights can also be posed as $\min_{\beta}\|R\beta\|_2$. Incorporating the constraint $$\sum_{l=1}^{L} \beta_l = 1,$$

it can be seen that the final approximation Cβ lies in the affine hull generated by the columns of C, and the final residual, Rβ, lies in the affine hull generated by the columns of R. Clearly the final residual will be zero, only if the data x lies in the affine hull of C, or equivalently the zero vector lies in the affine hull of R. When this does not hold, the worst case bound on r given by (7) holds in this case as well.

$$\beta_l \geq 0, \sum_{l=1}^{L} \beta_l = 1:$$

Similar to the previous case, the total residual can be expressed as (8). As a result, the final representation Cβ lies in the convex hull generated by the columns of C, and the final residual, Rβ, lies in the convex hull generated by the columns of R. Furthermore, the final residual will be zero only if the zero vector lies in the convex hull of R. Clearly, the worst case bound on r given by (7) holds in this case.

The first case is unconstrained and it should result in the least error. The second case constrains that the solution should lie in the simplical cone spanned by the columns of C, and this should lead to higher residual energy than Case 1. Case 3 constrains the solution to lie in an affine hull, which is of L−1 dimensions compared to simplical cone in L dimensions, so it could lead to a higher error compared to Case 2. Case 4 is the subset of constraint spaces for Cases 1 to 3 and hence it will lead to the highest residual error.

Demonstration of Ensemble Representations

In order to demonstrate the performance of ensemble representations with real data, we obtain a random set of 100,000 patches, each of size 8×8, from a set of natural images. The training images consisted of a wide variety of patterns and textures. The chosen patches are then processed to remove the mean, followed by the removal of low-variance patches. Since image recovery is the important application of the proposed models, considering high-variance patches alone is beneficial. Each dictionary in the ensemble D, is obtained as a random set of K vectorized, and normalized patches. We fix the number of models in the ensemble as L=20. The test data is a random set of 1000 grayscale patches different from the training set. For each test sample, we compute the set of L approximations using the sparse model given in (1), with λ=0.2. The individual approximations are combined into an ensemble, under the four conditions on the weights, $\{\beta_l\}$, described above. The optimal weights are computed and the mean squared norm of the residuals for all the test samples are compared in the table 100 of FIG. 1, for the dictionary sizes K={256, 1025, 2048}. compared in the table 100 of FIG. 1, for the dictionary sizes K={256, 1025, 2048}. Referring now to the table 100, we observe that the performance of the ensembles generally improve as the size of the dictionaries 102 used in the base models increase. The variation in performance across all the four cases of weights follows our reasoning in the previous section. We refer to these as "oracle" ensemble models, since the weights are optimally computed with perfect knowledge of all the individual approximations and the actual data. In practice, the weights will be precomputed from the training data.

Proposed Ensemble Sparse Representation Algorithms

The ensemble model proposed in (4) results is a good approximation for any known data. However, in order to use ensemble models in analysis and recovery of images, that are possibly corrupted or degraded, both the weights $\{\beta_l\}_{l=1}^L$ and the dictionaries $\{D_l\}_{l=1}^L$ must be inferred from uncorrupted training data. Let us denote the set of training samples as $X=[x_1\ x_2\ \ldots\ x_T]$, and the set of coefficients in base model 1 as $A_l=[a_{l,1}\ a_{l,2}\ \ldots,\ a_{l,T}]$, where $a_{l,i}$ is the coefficient vector of the $i^{th}$ sample for base model 1. In the proposed ensemble learning procedures, we consider both simple averaging and boosting approaches.

Random Example Averaging Approach

The first approach chooses L random subsets of K samples from the training data itself and normalizes them to form the dictionaries $\{D_l\}_{l=1}^L$. The weights $\{\beta_l\}$ are chosen to be equal for all base models as 1/L. Note that the selection of dictionaries follows the same procedure as given in the previous demonstration described above. We refer to this ensemble approach as Random Example Averaging (RandExAv).

Boosting Approaches

The next two approaches use boosting and obtain the dictionaries and weights sequentially, such that the training examples that resulted in a poor performance with the $l-1^{th}$ base model are given more importance when learning the $l^{th}$ base model. We use a greedy forward selection procedure for obtaining the dictionaries and the weights. In each round l, the model is augmented with one dictionary $D_l$, and the weight $\alpha_l$ corresponding to the dictionary is obtained. The cumulative representation for round l is given by $$X_l = (1-\alpha_l)X_{l-1} + \alpha_l D_l A_l \quad (9)$$

Note that the weights of the greedy forward selection algorithm, $\alpha_l$, and the weights of the ensemble model, $\beta_l$, are related as $$\beta_l = \alpha_l \prod_{t=l+1}^{L} (1-\alpha_t) \quad (10)$$

From (9), it can be seen that $X_l$ lies in the affine hull of $X_{l-1}$ and $D_l A_l$. Furthermore, from the relationship between the weights $\{\alpha_l\}$ and $\{\beta_l\}$ given in (10), it is clear that $$\sum_{l=1}^{L} \beta_l = 1$$

and hence the ensemble model uses the constraints given in Case 3. Only the Cases 3 and 4 lead to an efficient greedy forward selection approach for the ensemble model in (4), and we use Case 3 since it leads to a better approximation performance (FIG. 1).

In boosted ensemble learning, the importance of the training samples in a particular round is controlled by modifying their probability masses. Each round consists of (a) learning a dictionary $D_l$ corresponding to the round, (b) computing the approximation for the current round l, (c) estimating the weight $\alpha_l$, (d) computing the residual energy for the training samples, and (e) updating the probability masses of the training samples for the next round. Since the goal of ensemble approaches is to have only weak individual models, $D_l$ is obtained using naive dictionary learning procedures as described later in this section. The dictionaries for the first round are obtained by fixing uniform probability masses for each training example in the first round, (i.e.), $p_1(x_i)=1/T$ for $i=\{1, 2, \ldots, T\}$. Assuming that $D_l$ is known, the approximation for the current round is computed by coding the training samples X with the dictionary using (1). The weight $\alpha_l$ is computed such that the error between the training samples and the cumulative approximation $X_l$ is minimized. Using (9), this optimization can be expressed a $$\min_{\alpha_l} \|X_l - [(1-\alpha_l)X_{l-1} + \alpha_l D_l A_l]\|_F^2 \quad (11)$$

and can be solved in closed form with the optimal value given as, $$\alpha_l = \frac{T_r[(X-X_{l-1})^T(D_l A_l - X_{l-1})]}{\|D_l A_l - X_{l-1}\|_F^2} \quad (12)$$

wherein $T_r$ denotes the trace of the matrix. The residual matrix for all the training samples in round 1 is given by $R_l = X - D_l A_l$. The energy of the residual for the $i^{th}$ training sample is given as $e_l(i) = \|r_{l,i}\|_2^2$. If the dictionary in round 1 provides a large approximation error for sample i, then that sample will be given more importance in round l+1. This will ensure that the residual error for sample i in round l+1 will be small. The simple scheme of updating the probability masses as $p_{l+1}(x_i) = e_l(i)$, upweights the badly represented samples and downweights the well-represented ones for the next round.

Given a training set $\{x_i\}_{i=1}^L$, and its probability masses $\{p_l(x_i)\}_{i=1}^L$, we will propose two simple approaches for learning the dictionaries corresponding to the individual sparse models.

BoostEx: From (3), it is clear that the learned dictionary atoms are close to training samples that have higher probabilities. Therefore, in the BoostEx method, the dictionary for round 1 is updated by choosing K data samples based on the non-uniform weight distribution, $\{p_l(x_i)\}_{i=1}^T$, and normalizing them. This scheme will ensure that those samples with high approximation errors in the previous round, will be better represented in the current round.

Demonstration of the Proposed Approaches

Figure 2:
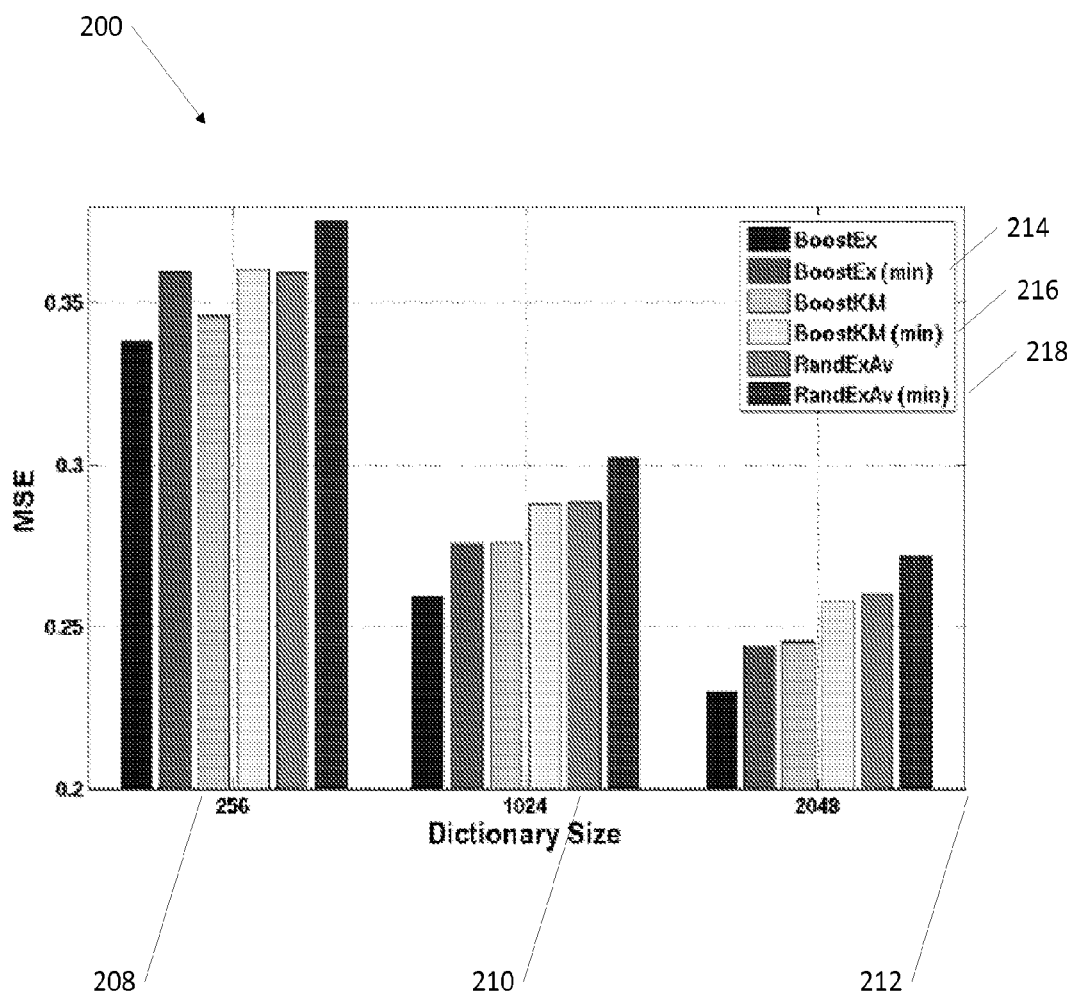
Figure 3:
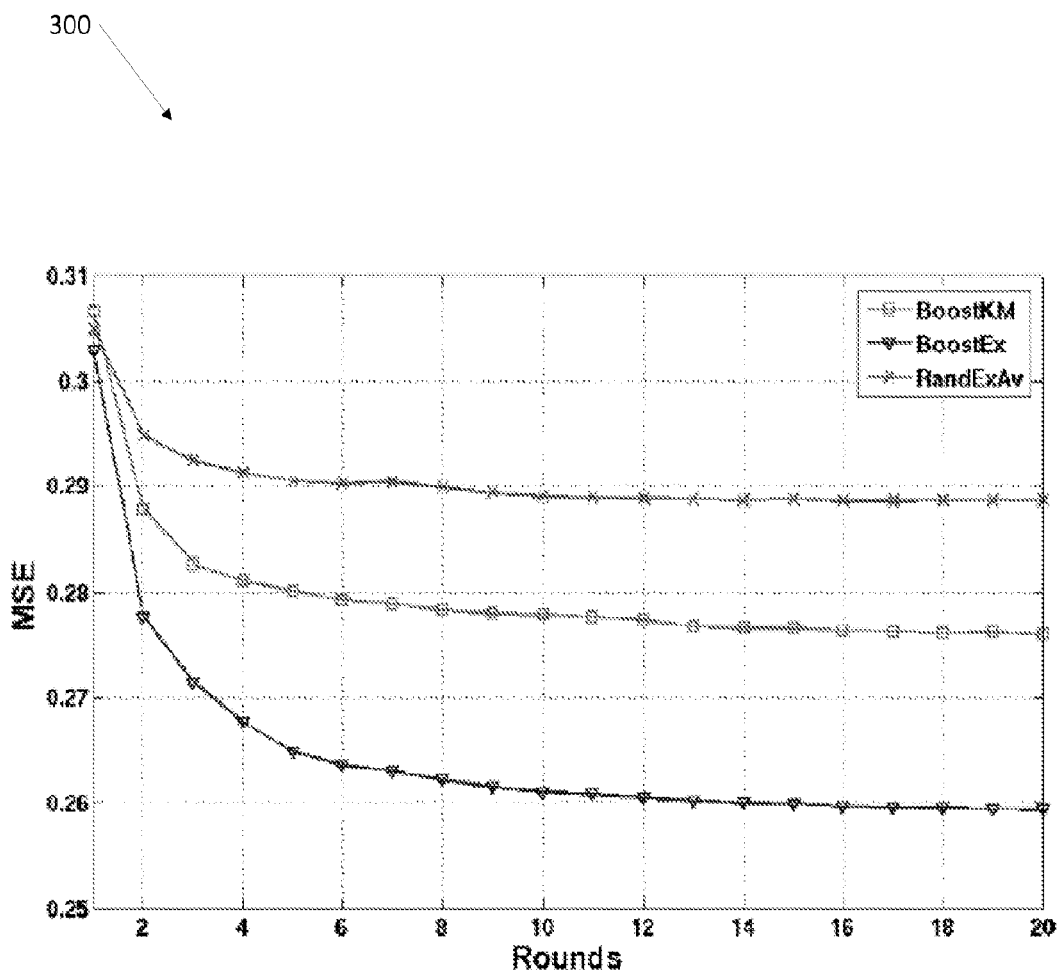
FIG. 3 is an illustration of a convergence table, according to aspects of the present disclosure.

The performance of the proposed ensemble schemes for dictionaries of three different sizes K={256, 1024, 2048} are compared. The same training set is used with the RandExAv and BoostEx schemes. The dictionaries $\{D_{t,l}\}_{t=1}^L$ and the weights $\{\beta_{t,l}\}_{t=1}^L$ are obtained with the above schemes for L=20. The individual approximations in the training set are obtained using (1) with the sparsity penalty set as $\lambda=0.2$. For each sample in the test set, the individual representations are computed using (1) with $\lambda=0.2$. The ensemble approximation the $i^{th}$ test sample is obtained as $\sum_{t=1}^L \beta_t D_t a_{t,i}$. FIG. 2 provides an illustration of a table 200 that compares the performances of the proposed schemes 202, 204, and 206 for different dictionary sizes 208, 210, and 212. The minimum error obtained across all individual approximations 214, 216, and 218 is also shown for comparison, with both methods and the different dictionary sizes (i.e. dictionaries 208, 210, and 212). It can be seen that the proposed schemes satisfy the basic property of the ensemble, i.e., the ensemble approximation performs better than the best constituent individual approximation of table 100 if FIG. 1. As the number of number of approximations in the ensemble increase, the average mean squared error (MSE) 220 for the proposed methods reduce, as shown in table 300 of FIG. 3 for a dictionary size of 1024. Clearly, increasing the number of models in the ensemble results in a better approximation, but the MSE flattens out as the number of rounds increase.

Application: Image Restoration

Figure 4:
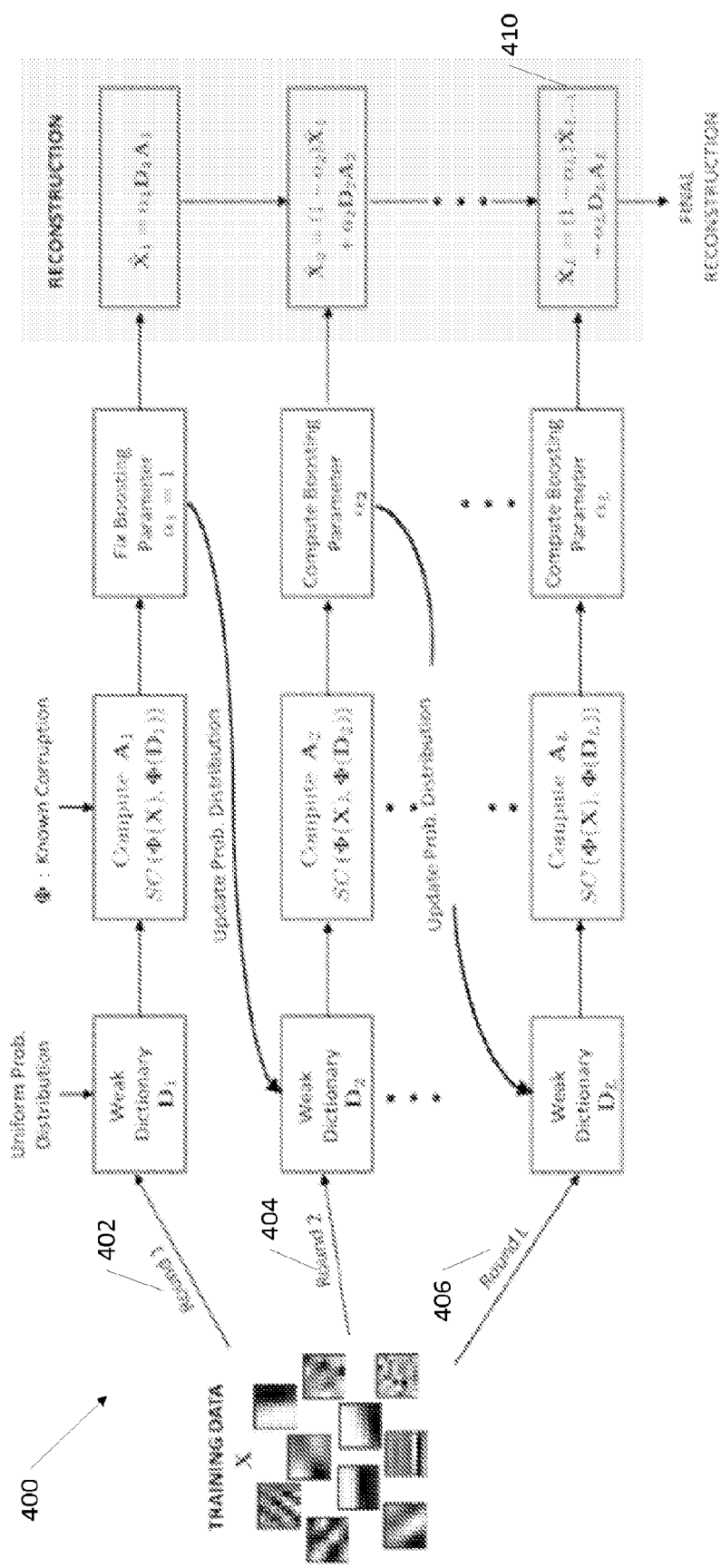
FIG. 4 a flow chart illustrating a boosted dictionary learning process, according to aspects of the present disclosure.

In restoration applications, it is necessary to solve an inverse problem, in order to estimate the test data y from $$z = \Phi(y) + n \quad (14)$$

where $\Phi(.)$ is the corruption operator and n is the additive noise. If the operator $\Phi(.)$ is linear, we can represent it using the matrix $\Phi$. With the prior knowledge that y is sparsely representable in a dictionary D according to (1), (14) can be expressed as $z = \Phi Da + n$. Restoring x now reduces to computing the sparse codes a by solving $$\min_a \|z - \Phi Da\|_2^2 + \lambda \|a\|_1 \quad (15)$$

and finally estimating y=Da. In the proposed ensemble methods, the final estimate of x is obtained as a weighted average of the individual approximations. Furthermore, in the boosting approach, the degradation operation can be included when learning the ensemble. This is achieved by degrading the training data as $\Phi X$, and obtaining the approximation with the coefficients computed using (15) instead of (1). The procedure to obtain boosted dictionaries using degraded data and computing the final approximation is illustrated in FIG. 4. As illustrated, multiple rounds of boosting 402, 404, and 406 are calculated or otherwise executed from training data 400 to generate the final approximation 410. Stated differently, the final approximation 410 is estimated sequentially using the weights $\{\alpha_t\}_{t=1}^L$, but it is equivalent to computing $\{\beta_t\}_{t=1}^L$ using (10) and computing the ensemble estimate $\Sigma_{t=1}^L \beta_t D_t A_t$.

Compressive Recovery

In compressed sensing (CS), the N-dimensional observation z is obtained by projecting the M-dimensional data y onto a random linear subspace, where N<<M. In this case, the entries of the degradation matrix $\varphi \in \mathcal{R}^{N \times M}$ are obtained as i.i.d. realizations of a Gaussian or Bernoulli random variable. Compressive recovery can be effectively performed using conventional dictionaries or ensemble dictionaries. In addition, the proposed idea of ensemble learning can be incorporated in existing learning schemes to achieve improved recovery performance. In particular, the multilevel dictionary learning algorithm can be very easily adapted to compute ensemble representations. Before discussing the experimental setup, and the results of the proposed methods, we will describe the modification to multilevel dictionary learning for improving the compressed recovery performance with learned dictionaries.

Improved Multilevel Dictionaries:

The multilevel dictionary (MLD) learning algorithm is a hierarchical procedure where the dictionary atoms in each level are obtained using a one dimensional subspace clustering procedure. Multilevel dictionaries have been shown to generalize well to novel test data, and have resulted in high performance in compressive recovery. We propose to employ the RandExAv procedure in each level of multilevel learning to reduce overfitting and thereby improve the accuracy of the dictionaries in representing novel test samples. In each level, L different dictionaries are drawn as random subsets of normalized training samples. For each training sample, a 1-sparse representation is computed with each individual dictionary, and the approximations are averaged to obtain the ensemble representation for that level. Using the residual vectors as the training data, this process is repeated for multiple levels. The sparse approximation for a test sample is computed in a similar fashion. Since the sparse code computation in each level is performed using simple correlation operations, the computation complexity is not increased significantly by employing ensemble learning. In our simulations, we will refer to this approach as Example-based Multilevel Dictionary learning (Ex-MLD).

Results:

The training set is the same as that described above. For the baseline Alt-Opt approach, we train a single dictionary with K=256 using 100 iterations with the sparsity penalty $\lambda_{tr}$ set to 0.1. The ensemble learning procedures BoostEx and RandExAv are trained with L=50 and K=256 for sparsity penalty $\lambda_{tr}$=0.1. The boosted ensembles are trained by taking the random projection operator into consideration, as discussed in Section IV for the reduced measurements, N={8, 16, 32}. For the Ex-MLD method, both the number of levels and the number of atoms in each level were fixed at 16. In each level, we obtained L=50 dictionaries to compute the ensemble representation.

Figure 5:
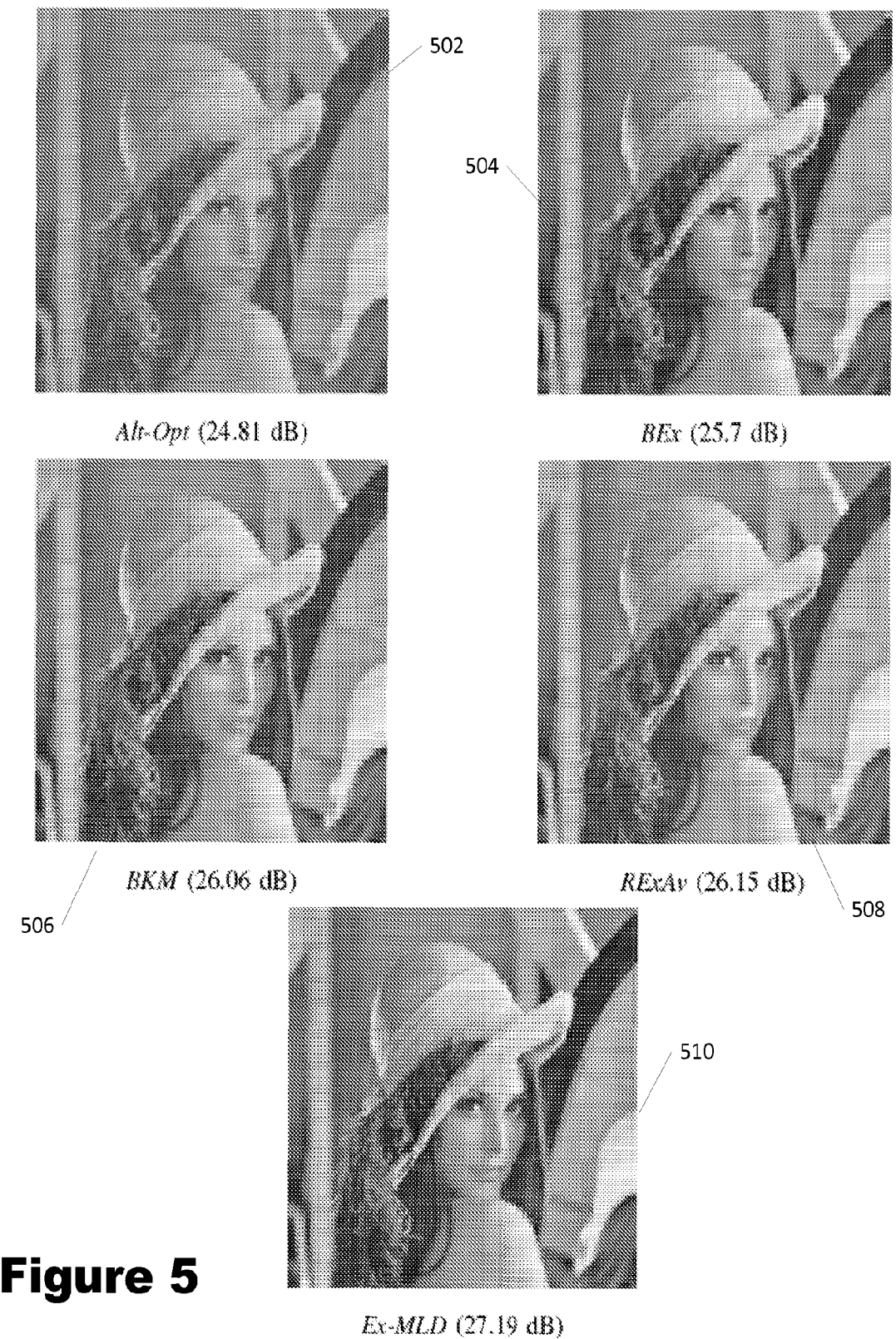
FIG. 5 is an illustration of images, according to aspects of the present disclosure.

The recovery performance of the proposed ensemble models is evaluated using the set of standard images shown in Table I 1000 of FIG. 10. Each image 1001 is divided into non-overlapping patches of size 8×8, and random projection is performed with the number of measurements set at N={8, 16, 32}. For the Alt-Opt procedure, the individual patches are recovered using (15), and for the ensemble methods, the approximations computed using the L individual dictionaries are combined. The penalty $\lambda_{te}$ is set to 0.1 for sparse coding in all cases. For each method, the PSNR values were obtained by averaging the results over 10 iterations with different random measurement matrices, and the results are reported in Table I. It was observed that the proposed ensemble methods outperform the Alt-Opt methods in all cases. In particular, we note that the simple RandExAv performs better than the boosting approach, although it was shown previously that boosting approaches show a superior performance. The reason for this discrepancy is that boosting aggressively reduces error with training data, and hence may lead to overfitting with degraded test data. Whereas, the RandExAv method provides the same importance to all individual approximations both during the training and the testing phases. As a result, it provides a better generalization in the presence of degradation. We also note that similar behavior has been observed with ensemble classification methods. Random sampling methods such as bagging perform better than boosting with noisy examples, since bagging exploits classification noise to produce more diverse classifiers. Furthermore, we observed that the proposed Ex-MLD method performed significantly better than all approaches, particularly for lower number of measurements. FIG. 5 shows images 502-510 recovered using the different approaches, when N was fixed at 8. As it can be observed, the Ex-MLD and RandExAv methods (i.e. 510 and 508) provide PSNR gains of 2.38 dB and 1.34 dB respectively, when compared to the Alt-Opt approach.

Single Image Superresolution

Single image superresolution (SISR) attempts to reconstruct a high-resolution image using just a single low-resolution image. It is a severely ill-posed problem and in sparse representation based approaches, the prior knowledge that natural image patches can be represented as a sparse linear combination of elementary patches, is used. The degraded test image is represented as Z=ΦY, where the operator Φ the blurs the high-resolution image Y and then downsamples it. Note that Y and Z denote vectorized high- and low-resolution images respectively. Each overlapping patch obtained from the degraded image is denoted as z. The paired dictionary learning procedure (PairDict) has been very effective in recovering the high-resolution patches. This method initially creates degraded counterparts of the high-resolution training images, following which gradient-based features are extracted from the low-resolution patches and the features are appended to the corresponding vectorized high-resolution patches. These augmented features are used to train a paired dictionary $$\begin{pmatrix} D_{lo} \\ D_{hi} \end{pmatrix}$$

such that each low-resolution and its corresponding high-resolution patches share the same sparse code. For a low-resolution test patch z, the sparse code a is obtained using $D_{lo}$, and the corresponding high-resolution counterpart is recovered as y=$D_{hi}$a. An initial estimate $Y_0$ of the high-resolution image is obtained by appropriately averaging the overlapped high-resolution patches. Finally, a global reconstruction constraint is enforced by projecting $Y_0$ on to the solution space of ΦY=Z, $$\min_Y \|Z - \Phi Y\|_2^2 + c\|Y - Y_0\|_2^2 \qquad (16)$$

to obtain the final reconstruction. As an alternative, in the example-based procedure (ExDict) the dictionaries $D_{lo}$ and $D_{hi}$ are directly fixed as the features extracted from low-resolution patches and vectorized high resolution patches respectively. Similar to the PairDict method, the global reconstruction constraint in (16) is imposed for the final reconstruction.

In our simulations, standard grayscale images 1004 (Table II 1002 of FIG. 10) are magnified by a factor of 2, using the proposed approaches. In addition to the PairDict and ExDict methods, simple bicubic interpolation is also used as a baseline method. We also obtained paired dictionaries with 1024 atoms using 100,000 randomly chosen patches of size 5×5 from the grayscale natural images in the training set. The sparsity penalty used in training was $\lambda_{tr}$=0.15. The training set was reduced to the size of 20,000 samples and used as the dictionary for the ExDict method. For ensemble learning, L was fixed at 50 and the approximation for each data sample was obtained using just a 1-sparse representation.

Figure 6:
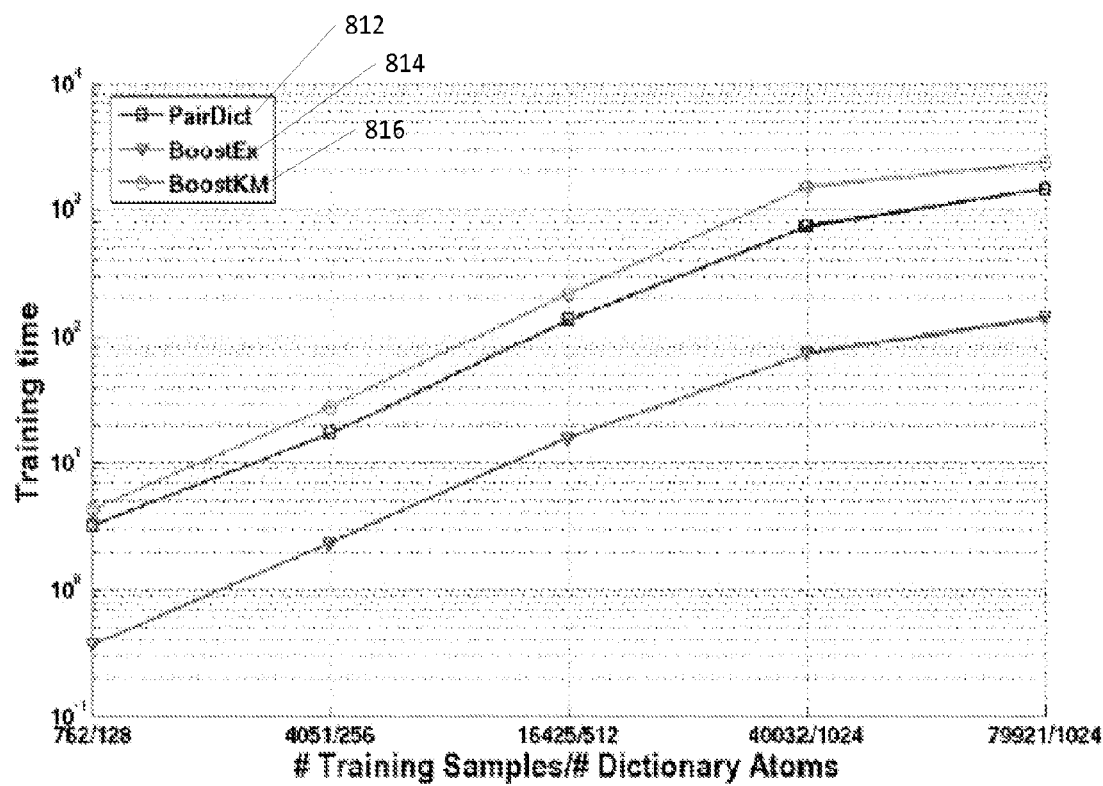
FIG. 6 is an illustration of a table, according to aspects of the present disclosure.

For different number of training samples, we compared the training times for PairDict (40 iterations) and BoostEx (L=50) algorithms in table 800 of FIG. 6. The computation times were obtained using a single core of a 2.8 GHz Intel i7 Linux machine with 8 GB RAM. The BoostEx approach 814 has lesser computational complexity for training compared to the PairDict approach 812. The ExDict procedure requires no training and for RandExAv, training time is just the time for randomly selecting K samples from the training set of T samples, for L rounds. Clearly, the complexity incurred for this is extremely low.

For the test images, SISR is performed using the baseline PairDict 812 and ExDict approaches using a sparsity penalty of $\lambda_{te}$=0.2. The recovery performance of the proposed algorithms are reported in Table II. For PairDict 812, as well the proposed ensemble methods, the dictionary size is fixed at 1024, whereas all the examples are used for training with the ExDict approach. We observed from our results that an ensemble representation with a simplified sparse coding scheme (1-sparse) matched the performance of the baseline methods, as illustrated in images 902, 904, 906, 908, and 910 of FIG. 7.

Several approaches exist for recovering images from their degraded observations. Recently, methods based on sparse representations have gained prominence and provide state-of-the-art performance. The use of sparse models is motivated by its ability to effectively represent natural images as a sparse linear combination of elementary patterns. These patterns are typically stacked together as columns of a "dictionary" matrix, and the dictionary can be inferred from training examples using a variety of learning algorithms.

The important challenges associated with the use of sparse models include: (i) computational complexity of obtaining sparse codes, (ii) scalability of dictionary learning algorithms, and (iii) non-availability of a large training dataset. Various embodiments of the current invention address these challenges by proposing to use an ensemble of multiple sparse models that are learned using low-complexity approaches. The approximation with each sparse model is obtained using a parallel-friendly "Correlate-and-Maximum" procedure. The final reconstruction is obtained by suitably aggregating the approximations from the individual models. The dictionary for each sparse model can be designed either using different random subsets from the training data (bagging), or sequentially such that the current dictionary emphasizes those data samples that were not well represented in the previous iteration (boosting).

Our results with two image recovery problems, compressive sensing and image superresolution, demonstrate that the simple recovery procedure with the proposed ensemble method matches or improve over the performance of several existing methods, at reduced computational complexity. Incorporating the ensemble dictionaries in hierarchical multilevel learning and obtaining multiple dictionaries in each level leads to further performance improvements.

Various embodiments of the present disclosure include some or all of the following:

1. The proposed scheme uses an ensemble of sparse models for recovering degraded images, where each model is obtained from uncorrupted training data and combined using bagging/boosting strategies.

2. Learning each model in the ensemble is a low-complex and simple procedure. The dictionary for each model is a random subset selected from the training examples and individual approximations with each model are obtained using simple correlation operations.

3. For a degraded observation, the computation of individual approximations can be parallelized as they involve only a simple "Correlate-and-Maximum" procedure. The final approximation is just an aggregation of the individual approximations with weights that are pre-computed in the training stage.

4. Depending on the application, the knowledge of degradation and the error from the previous approximation can be incorporated to "boost" the approximations and obtain better models. Recovery performance is further improved by incorporating the proposed ensemble models in the hierarchical multilevel dictionary learning algorithm.

5. The performance of existing image recovery algorithms that use sparse models is dependent on the availability of a rich set of training examples. Due to training complexity and data availability, a typical learning algorithm may only use a small set of samples to infer sparse models. By using an ensemble of weak sparse models, a number of embodiments address the statistical and computational challenges in learning, and thereby provide high fidelity image recovery.

6. When the form of degradation is known, it can be incorporated during the training process itself.

7. In contrast to other sparse modeling methods, the complex dictionary design procedure during training is replaced by a simple table-lookup process.

8. The proposed system may be highly scalable as it is parallel-friendly. Computation of the sparse code for a test sample using each model in the ensemble can be performed on a GPU. Sparse coding is simplified into a "Correlate-and-Maximum" procedure that can be easily fit in a single CUDA-GPU kernel. By storing the look-up tables in the GPU memory and performing all computations in the GPU, the full potential of GPUs can be harnessed enabling real time applications.

Advancement in imaging technologies is beneficial in several modern-day computing paradigms. Recovering images from different forms of degradation is a fundamental problem in a variety of imaging modalities. Efficient and low-complexity algorithms are important for commercial applications in mobile image processing and medical imaging, as examples. Availability of large-scale data has added another new dimension to computational challenges. The limited size and cost constraints of mobile devices prohibits the use of bulky and expensive optics and sensors for good imaging. Image recovery algorithms can bridge the gap between low-cost sensing and high-quality image rendering.

Although several image processing solutions exist for these problems, the more recent sparse modeling methods have had a significant impact. The improved performance of sparse models comes at the price of increase in complexity and dependency on a rich set of training examples. Aspects of the present disclosure propose the use of an ensemble of multiple "weak" sparse models to obtain improved estimates even under limited training conditions. Furthermore, by simplifying the sparse coding and dictionary inference processes to "Correlate-and-Maximum" procedures, certain embodiments make it viable and economical to use sparse models in commercial systems. In various embodiments, the proposed method can enhance low resolution/degraded images to high resolution images using a parallel implementation with multi-core CPUs and GPUs on mobile devices, desktops, and servers, for instance. This new technology can make a strong impact in the areas of HDTV, medical/satellite imaging, mobile image processing, and remote sensing, as examples.

Figure 8:
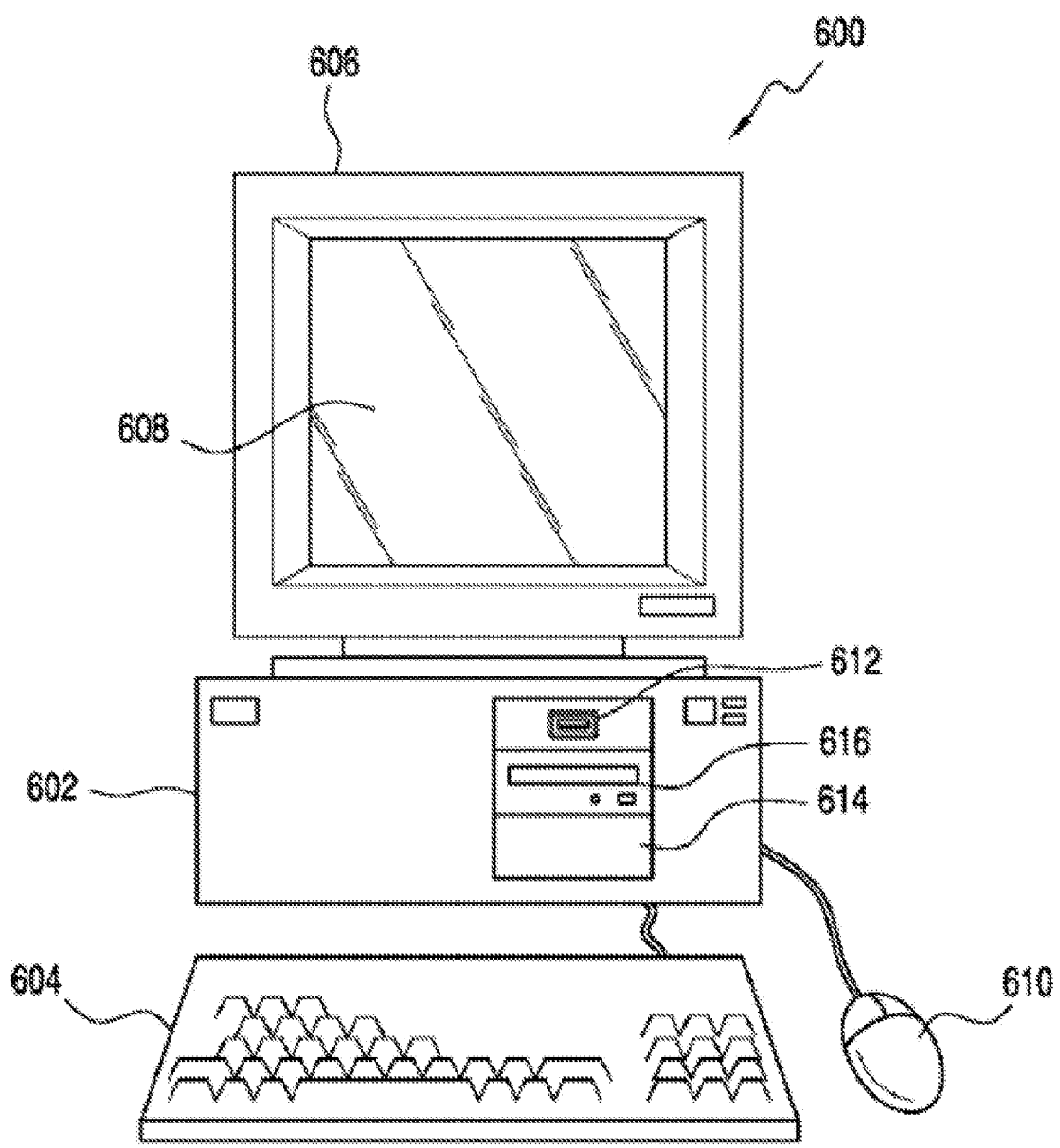
FIG. 8 illustrates an example computing device, according to aspects of the present disclosure.
Figure 9:
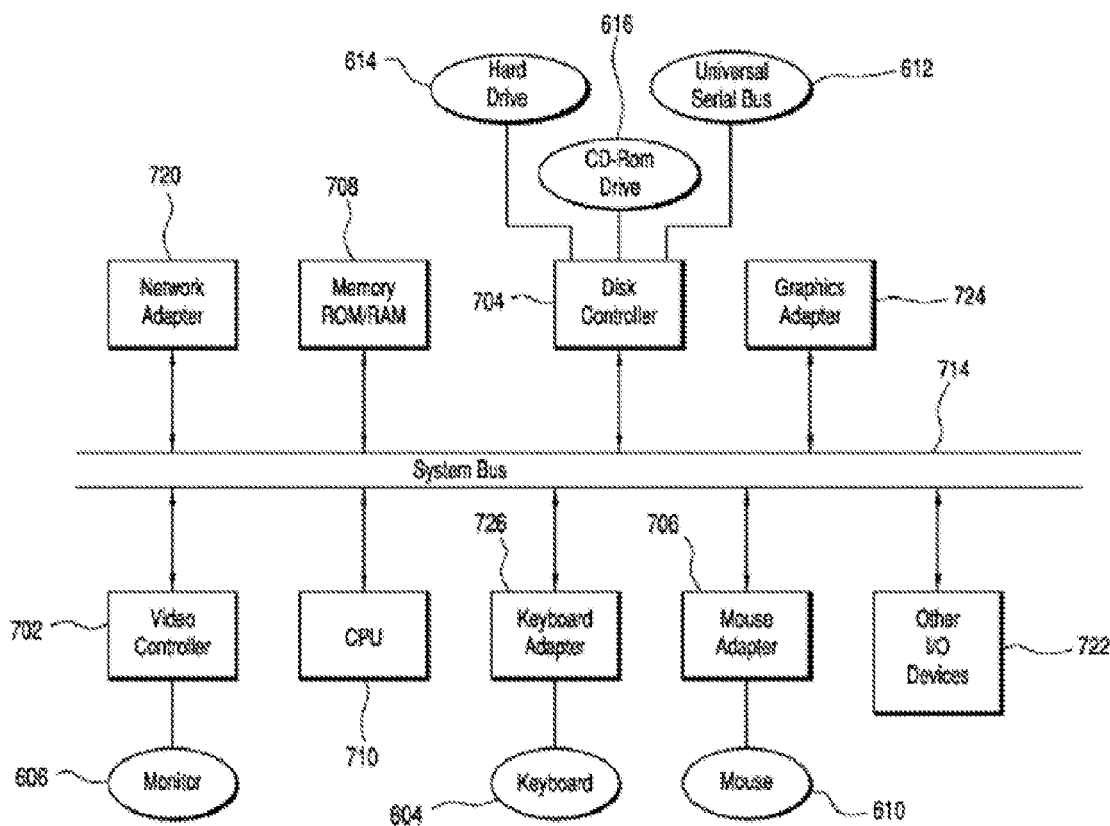
FIG. 9 illustrates an example computing system, according to aspects of the present disclosure.

FIG. 8 illustrates an exemplary embodiment of computer system 600, all of which or a portion of which can be suitable for implementing the techniques described above. As an example, a different or separate one of chassis 602 (and its internal components) can be suitable for implementing the techniques described above. Furthermore, one or more elements of computer system 600 (e.g., refreshing monitor 606, keyboard 604, and/or mouse 610, etc.) can also be appropriate for implementing the techniques described above. Computer system 600 comprises chassis 602 containing one or more circuit boards (not shown), Universal Serial Bus (USB) port 612, Compact Disc Read-Only Memory (CD-ROM) and/or Digital Video Disc (DVD) drive 616, and hard drive 614. A representative block diagram of the elements included on the circuit boards inside chassis 602 is shown in FIG. 9. Central processing unit (CPU) 710 in FIG. 9 is coupled to system bus 714 in FIG. 9. In various embodiments, the architecture of CPU 710 can be compliant with any of a variety of commercially distributed architecture families.

Figure 7:
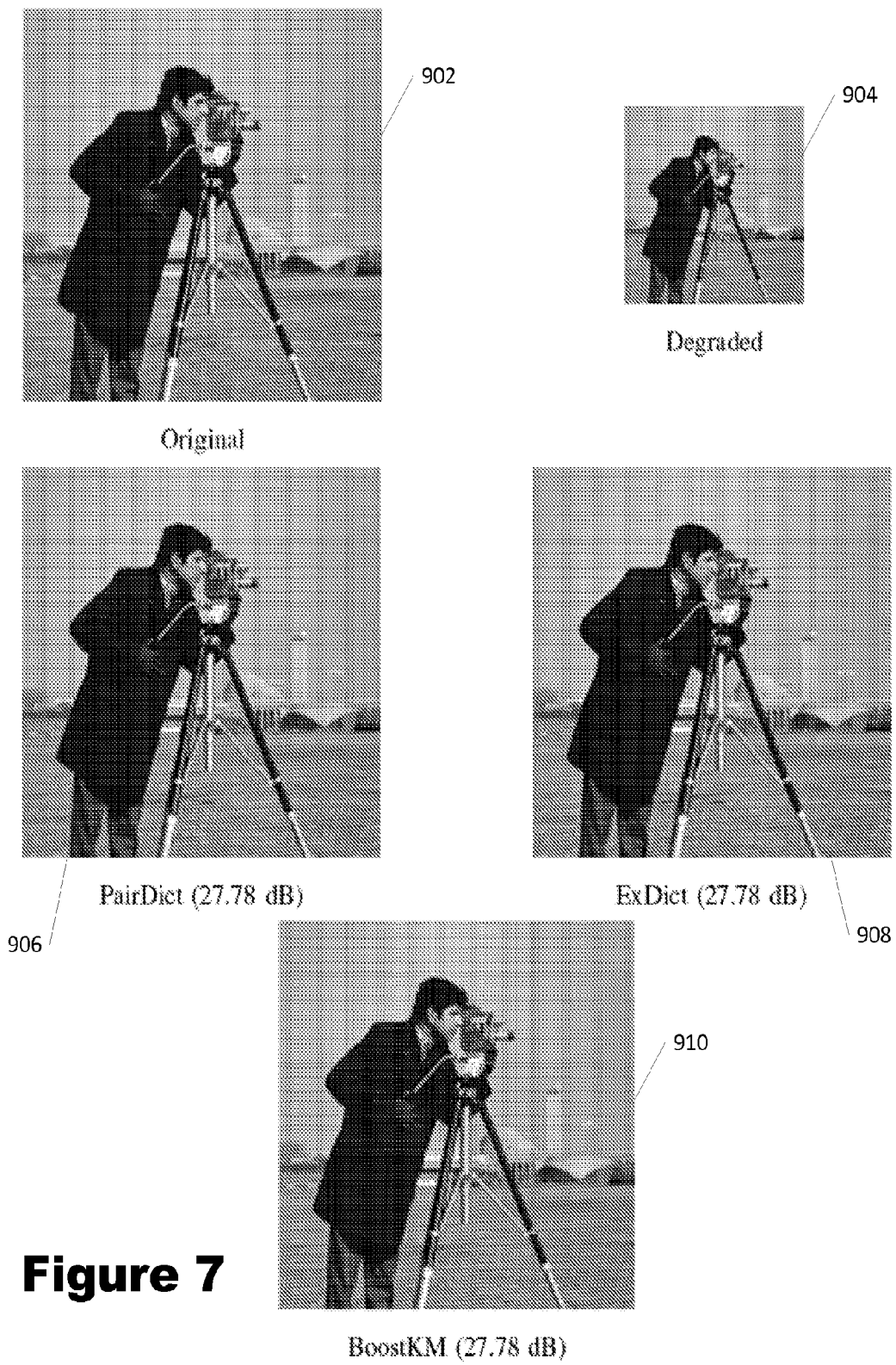
FIG. 7 is an example images, according to aspects of the present disclosure.

Continuing with FIG. 9, system bus 714 also is coupled to memory storage unit 708, where memory storage unit 708 comprises both read only memory (ROM) and random access memory (RAM). Non-volatile portions of memory storage unit 708 or the ROM can be encoded with a boot code sequence suitable for restoring computer system 600 (FIG. 8) to a functional state after a system reset. In addition, memory storage unit 708 can comprise microcode such as a Basic Input-Output System (BIOS). In some examples, the one or more memory storage units of the various embodiments disclosed herein can comprise memory storage unit 708, a USB-equipped electronic device, such as, an external memory storage unit (not shown) coupled to universal serial bus (USB) port 612 (FIGS. 6-7), hard drive 614 (FIGS. 6-7), and/or CD-ROM or DVD drive 616 (FIGS. 6-7). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 710.

In the depicted embodiment of FIG. 9, various I/O devices such as disk controller 704, graphics adapter 724, video controller 702, keyboard adapter 726, mouse adapter 706, network adapter 720, and other I/O devices 722 can be coupled to system bus 714. Keyboard adapter 726 and mouse adapter 706 are coupled to keyboard 604 (FIGS. 8 and 9) and mouse 610 (FIGS. 8 and 9), respectively, of computer system 600 (FIG. 8). While graphics adapter 724 and video controller 702 are indicated as distinct units in FIG. 9, video controller 702 can be integrated into graphics adapter 724, or vice versa in other embodiments. Video controller 702 is suitable for refreshing monitor 606 (FIGS. 8 and 9) to display images on a screen 608 (FIG. 8) of computer system 600 (FIG. 8). Disk controller 704 can control hard drive 614 (FIGS. 8 and 9), USB port 612 (FIGS. 8 and 9), and CD-ROM drive 616 (FIGS. 8 and 9). In other embodiments, distinct units can be used to control each of these devices separately.

In some embodiments, network adapter 720 can comprise and/or be implemented as a WNIC (wireless network interface controller) card (not shown) plugged or coupled to an expansion port (not shown) in computer system 600 (FIG. 8). In other embodiments, the WNIC card can be a wireless network card built into computer system 600 (FIG. 8). A wireless network adapter can be built into computer system 600 by having wireless communication capabilities integrated into the motherboard chipset (not shown), or implemented via one or more dedicated wireless communication chips (not shown), connected through a PCI (peripheral component interconnector) or a PCI express bus of computer system 600 (FIG. 8) or USB port 612 (FIG. 8). In other embodiments, network adapter 720 can comprise and/or be implemented as a wired network interface controller card (not shown).

Although many other components of computer system 600 (FIG. 8) are not shown, such components and their interconnection are well known to those of ordinary skill in the art. Accordingly, further details concerning the construction and composition of computer system 600 and the circuit boards inside chassis 602 (FIG. 8) are not discussed herein.

When computer system 600 in FIG. 8 is running, program instructions stored on a USB-equipped electronic device connected to USB port 612, on a CD-ROM or DVD in CD-ROM and/or DVD drive 616, on hard drive 614, or in memory storage unit 708 (FIG. 9) are executed by CPU 710 (FIG. 9). A portion of the program instructions, stored on these devices, can be suitable for carrying out at least part of the techniques described above.

Although computer system 600 is illustrated as a desktop computer in FIG. 8, there can be examples where computer system 600 may take a different form factor while still having functional elements similar to those described for computer system 600. In some embodiments, computer system 600 may comprise a single computer, a single server, or a cluster or collection of computers or servers, or a cloud of computers or servers. Typically, a cluster or collection of servers can be used when the demand on computer system 600 exceeds the reasonable capability of a single server or computer.

Various embodiments of the subject matter described herein include various combinations of the acts, structure, components, and features described herein, shown in the drawings, or that are known in the art. Moreover, certain procedures can include acts such as manufacturing, obtaining, or providing components that perform functions described herein or in the documents that are incorporated by reference. Furthermore, various embodiments include advertising and selling products that perform functions described herein, that contain structure described herein, or that include instructions to perform functions described herein, as examples. Such products may be obtained or provided through distributors, dealers, or over the Internet, for instance. The subject matter described herein also includes various means for accomplishing the various functions or acts described herein, in the documents that are incorporated by reference, or that are apparent from the structure and acts described.

Further, as used herein, the word "or", except where indicated otherwise, does not imply that the alternatives listed are mutually exclusive. Even further, where alternatives are listed herein, it should be understood that in some embodiments, fewer alternatives may be available, or in particular embodiments, just one alternative may be available, as examples.

What is claimed is:

1. A method for performing image recovery comprising:
generating, using at least one processor, an ensemble of sparse models from uncorrupted training data, comprising:
learning a dictionary from the uncorrupted training data by randomly selecting a subset of the uncorrupted training data to form the dictionary, and
learning at least one weight from the uncorrupted training data using an unconstrained least squares approximation, the at least one weight corresponding to the dictionary;
using respective sparse models of the ensemble of sparse models to generate a plurality of individual approximations of a first image, wherein each individual approximation of the plurality of individual approximations corresponds to a particular sparse model of the respective sparse models; and
aggregating, using the at least one processor, the individual approximations to generate a second image, by calculating a linear combination of the plurality of individual approximations with pre-determined weights applied to each individual approximation of the plurality of individual approximations.

2. The method of claim 1, wherein the first image is a degraded image and the second image is an improved image, wherein the respective sparse models are individual weak sparse models, and wherein aggregating the individual approximations comprises calculating a weighted average of the individual approximations.

3. The method of claim 1, wherein generating an ensemble of sparse models comprises learning at least one dictionary and at least one weight corresponding to the at least one dictionary from the uncorrupted training data sequentially, using a greedy forward selection procedure.

4. The method of claim 1, wherein generating an ensemble of sparse models comprises:
degrading uncorrupted training data; and
learning at least one dictionary from the degraded uncorrupted training data.

5. The method of claim 1, wherein each individual approximation of the individual approximations is determined using a low-complexity correlate-and-maximum procedure and wherein the sparse models represent images parsimoniously using elementary patterns from a dictionary matrix.

6. A system for performing image recovery comprising: at least one processor to:
generate an ensemble of sparse models from uncorrupted training data, comprising
learning a dictionary from the uncorrupted training data by randomly selecting a subset of the uncorrupted training data to form the dictionary; and
learning at least one weight from the uncorrupted training data using an unconstrained least squares approximation, the at least one weight corresponding to the dictionary;
use respective sparse models of the ensemble of sparse models to generate a plurality of individual approximations of a first image, wherein each individual approximation of the plurality of individual approximations corresponds to a particular sparse model of the respective sparse models; and aggregate the individual approximations to generate a second image,
wherein each individual approximation of the individual approximations is determined using a low-complexity correlate-and-maximum procedure, and wherein the sparse models represent images parsimoniously using elementary patterns from a dictionary matrix.

7. The system of claim 6, wherein aggregating the individual approximations comprises calculating a linear combination of the plurality of individual approximations with pre-determined weights applied to each individual approximation of the plurality of individual approximations.

8. The system of claim 6, wherein the first image is a degraded image and the second image is an improved image, wherein the respective sparse models are individual weak sparse models, and wherein aggregating the individual approximations comprises calculating a weighted average of the individual approximations.

9. The system of claim 6, wherein generating an ensemble of sparse models comprises learning at least one dictionary and at least one weight corresponding to the at least one dictionary from the uncorrupted training data sequentially, using a greedy forward selection procedure.

10. The system of claim 6, wherein generating an ensemble of sparse models comprises:
 degrading uncorrupted training data; and
 learning at least one dictionary from the degraded uncorrupted training data.

11. A non-transitory computer-readable medium encoded with instructions for performing image recovery, the instructions executable by a processor, comprising:
 generating an ensemble of sparse models from uncorrupted training data, comprising
  learning a dictionary from the uncorrupted training data by randomly selecting a subset of the uncorrupted training data to form the dictionary; and learning at least one weight from the uncorrupted training data using an unconstrained least squares approximation, the at least one weight corresponding to the dictionary
 using respective sparse models of the ensemble of sparse models to generate a plurality of individual approximations of a first image, wherein each individual approximation of the plurality of individual approximations corresponds to a particular sparse model of the respective sparse models; and
 aggregating the individual approximations to generate a second image,
 wherein the first image is a degraded image and the second image is an improved image, wherein the respective sparse models are individual weak sparse models, and wherein aggregating the individual approximations comprises calculating a weighted average of the individual approximations.

12. The non-transitory computer-readable medium of claim 11, wherein aggregating the individual approximations comprises calculating a linear combination of the plurality of individual approximations with pre-determined weights applied to each individual approximation of the plurality of individual approximations.

13. The non-transitory computer-readable medium of claim 11, wherein generating an ensemble of sparse models comprises:
 learning at least one dictionary from the uncorrupted training data by randomly selecting a subset of the uncorrupted training data to form the at least one dictionary; and
 learning at least one weight from the uncorrupted training data using an unconstrained least squares approximation, the at least one weight corresponding to the at least one dictionary.

14. The non-transitory computer-readable medium of claim 11, wherein generating an ensemble of sparse models comprises learning at least one dictionary and at least one weight corresponding to the at least one dictionary from the uncorrupted training data sequentially, using a greedy forward selection procedure.

15. The non-transitory computer-readable medium of claim 11, wherein each individual approximation of the individual approximations is determined using a low-complexity correlate-and-maximum procedure, and wherein the sparse models represent images parsimoniously using elementary patterns from a dictionary matrix.

\* \* \* \* \*